US008645116B2

(12) United States Patent
Lin et al.

(10) Patent No.: US 8,645,116 B2
(45) Date of Patent: Feb. 4, 2014

(54) HYBRID SIMULATION SYSTEM AND METHOD

(75) Inventors: Chi-Hung Lin, Kaohsiung (TW);
Che-Yu Liao, Kaohsiung (TW);
Ching-Hsiang Chuang, Taipei (TW);
Shing-Wu Tung, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 389 days.

(21) Appl. No.: 13/107,444

(22) Filed: May 13, 2011

(65) Prior Publication Data

US 2012/0179447 A1 Jul. 12, 2012

(30) Foreign Application Priority Data

Jan. 7, 2011 (TW) .............................. 100100723 A (51) Int. Cl.
*G06F 17/50* (2006.01)
(52) U.S. Cl.
USPC ................... 703/14; 703/13; 703/15; 703/16; 703/17
(58) Field of Classification Search
None
See application file for complete search history.

(56) References Cited

U.S. PATENT DOCUMENTS

| | | | |
|---|---|---|---|
| 7,328,429 B2 | 2/2008 | Hooper et al. | |
| 7,379,860 B1* | 5/2008 | Bartz et al. ........................ | 703/28 |
| 7,397,275 B2 | 7/2008 | Kelem et al. | |
| 7,409,330 B2 | 8/2008 | Kumamoto | |
| 8,352,924 B2 | 1/2013 | Wu et al. | |
| 2005/0187745 A1 | 8/2005 | Lurie et al. | |
| 2007/0192079 A1 | 8/2007 | Rompaey et al. | |
| 2008/0162070 A1* | 7/2008 | Yacobucci ..................... | 702/108 |
| 2009/0058701 A9* | 3/2009 | Swoboda ...................... | 341/139 |

FOREIGN PATENT DOCUMENTS

| | | |
|---|---|---|
| CN | 101501994 A | 8/2009 |
| TW | 201039142 A | 11/2010 |
| WO | 2007104930 A | 9/2007 |

OTHER PUBLICATIONS

Richard A. Uhlig, Trevor N. Mudge Trace-Driven Memory Simulation: A Survey ACM Computing Surveys, vol. 29, No. 2 Jun. 1997, pp. 128-170.*
Roberto Giorgi, Cosimo Antonio Prete, Gianpaolo Prina, Luigi Ricciardi Trace Factory Generating Workloads for Trace-Driven Simulation of Shared-Bus Multiprocessors IEEE Concurrency, 1997, pp. 54-68.*
Todd Austin, Dan Ernst SimpleScalar: An Infrastructure for Computer System Modeling Computer IEEE, Feb. 2002, pp. 59-67.*

(Continued)

*Primary Examiner* — Omar Fernandez Rivas
*Assistant Examiner* — Cuong Luu
(74) *Attorney, Agent, or Firm* — McClure, Qualey & Rodack, LLP (57) ABSTRACT

A hybrid simulation model includes a real model, a bus interface and an acceleration model. The real model simulates a group of instructions. The acceleration model includes a trace generation unit, a trace replay unit, a selection unit, a snapshot generation and load unit and a virtual breakpoint control unit. The trace generation unit records at least one trace file of the real model in a first simulation. The trace replay unit reads and accordingly accesses the at least one trace file. The selection unit dynamically switches to perform a real simulation or a trace simulation. The snapshot generation and load unit generates at least one status snapshot file and loads the at least one status snapshot file to the real model in repeated simulations. The virtual breakpoint control unit controls the selection unit to switch between the trace simulation and the real simulation according to a virtual breakpoint.

16 Claims, 4 Drawing Sheets

(56) References Cited

OTHER PUBLICATIONS

Chung, E.S., et al.; "Protoflex: FPGA-Accelerated Hybrid Functional Simulation;" Computer Architecture Lab at Carnegie Mellon (CALCM) Technical Report; 2007; pp. 1-6.

Scherrer, A., et al.; "Automatic Phase Detection for Stochastic On-Chip Traffic Generation;" 2006; pp. 88-93.

Wunderlich, R.E., et al.; "Smarts: Accelerating Microarchitecture Simulation via Rigorous Statistical Sampling;" pp. 1-12.

Wenisch, T.F., et al.; "TurboSmarts: Accurate Microarchitecture Simulation Sampling in Minutes;" 2005; pp. 408-409.

Speeding up SoC virtual platform simulation by data-dependency-aware synchronization and scheduling, Design Automation Conference (ASP-DAC), 2010 15th Asia and South Pacific, Jan. 18-21, 2010, pp. 143-148.

TW Office Action dated Nov. 4, 2013.

* cited by examiner

HYBRID SIMULATION SYSTEM AND METHOD

This application claims the benefit of Taiwan application Serial No. 100100723, filed Jan. 7, 2011, the subject matter of which is incorporated herein by reference.

BACKGROUND

1. Technical Field

This disclosure relates to a hybrid simulation system and a hybrid simulation method.

2. Description of the Related Art

Nowadays, the system chip design often adopts the simulator with the precise cycle to simulate the system performance before the real hardware design is executed, and the system performance serves as the basis for the development and design of the hardware architecture. The electronic system level (ESL) design process can build a more effective system-level development environment, and provide different levels of hardware architecture models according to different requirements. Thus, the objects of the performance analysis and the repaid architecture exploration can be achieved in the initial system design stage based on the simulation method.

In the current electronic device, however, various multimedia, including communication and video-audio multimedia, have to be integrated and applied to one single system, so that the system design becomes increasingly complicated. In correspondence with the architecture design, which is getting increasingly large and complicated, the lengthy simulation process has become the problem to be overcome in the development process. In addition, the design of the system chip trends to the multi-core design. The current single-threaded software simulation method causes the intolerable performance slow down in the more and more complicated parallel-process-simulation development environment.

For example, the errors occurred in the process of program execution often have to be solved by multiple times of repeated simulations in conjunction with the corresponding debugging method. However, the multiple times of repeated simulations cause the lengthy process, thereby causing inconvenience in the software development. Similarly, detailed analyses have to be made on the architecture exploration according to the bottleneck of the system performance, and the long simulation process has to be performed so that the analysis result of the important sector can be obtained, thereby wasting a lot of development time. Thus, how to shorten and accelerate the long simulation process has become the more and more important design issue.

SUMMARY

According to a first aspect of the disclosure, a hybrid simulation model including a real model, a bus interface and an acceleration model is provided. The real model simulates execution of a group of instructions on a hardware design. The bus interface provides the real model a function of accessing other slave models of the hardware design. The acceleration model includes a trace generation unit, a trace replay unit, a selection unit, a snapshot generation and load unit and a virtual breakpoint control unit. The trace generation unit records behavior of the real model for accessing the other slave models as at least one trace file and storing the at least one trace file to a computer usable medium when the real model is executing a first simulation. The trace replay unit reads the at least one trace file and accordingly performs an access operation in a plurality of repeated simulations after the first simulation. The selection unit dynamically switches to the real model to perform a real simulation or switches to the trace replay unit to perform a trace simulation in the plurality of repeated simulations. The snapshot generation and load unit generates at least one status snapshot file corresponding to at least one specific time point and stores the at least one status snapshot file to the computer usable medium when the real model is executing the first simulation, and loads the corresponding at least one status snapshot file to the real model when switching to the real model in the plurality of repeated simulations. The virtual breakpoint control unit controls the selection unit to switch between the trace simulation and the real simulation in the plurality of repeated simulations according to a virtual breakpoint set by a debugger in the at least one trace file.

According to a second aspect of the disclosure, a hybrid simulation method is provided. The method includes the following steps. A real model is utilized to simulate execution of a group of instructions on a hardware design, and a bus interface is utilized to provide the real model a function of accessing other slave models of the hardware design. The real model is utilized to execute a first simulation. A trace generation unit is utilized to record behavior of the real model for accessing the other slave models as at least one trace file in the first simulation, and to store the at least one trace file to a computer usable medium. A snapshot generation and load unit is utilized to generate at least one status snapshot file corresponding to at least one specific time point in the first simulation and to store the at least one status snapshot file to the computer usable medium. A virtual breakpoint control unit is utilized to control a selection unit to switch between a trace simulation and a real simulation in a plurality of repeated simulations after the first simulation according to a virtual breakpoint set by a debugger in the at least one trace file. A trace replay unit is utilized to read the at least one trace file and accordingly perform an access operation in the plurality of repeated simulations after the first simulation. The snapshot generation and load unit is utilized to load the corresponding at least one status snapshot file to the real model to perform the real simulation when switching to the real model in the plurality of repeated simulations. The selection unit is utilized to dynamically switch to the real model to perform the real simulation or to switch to the trace replay unit to perform the trace simulation in the plurality of repeated simulations.

The above and other aspects of the disclosure will become better understood with regard to the following detailed description of the non-limiting embodiment(s). The following description is made with reference to the accompanying drawings.

DETAILED DESCRIPTION

The hybrid simulation system and the hybrid simulation method proposed in this disclosure can automatically generate a hybrid simulation model, and dynamically switch between a real simulation and a trace simulation (or trace-driven simulation) in a simulation process. Thus, the lengthy simulation process can be improved while the simulation precision level is maintained, and can reach different multiples of acceleration effects by switching between different precision levels of trace simulations through the multi-level trace file.

Figure 1:
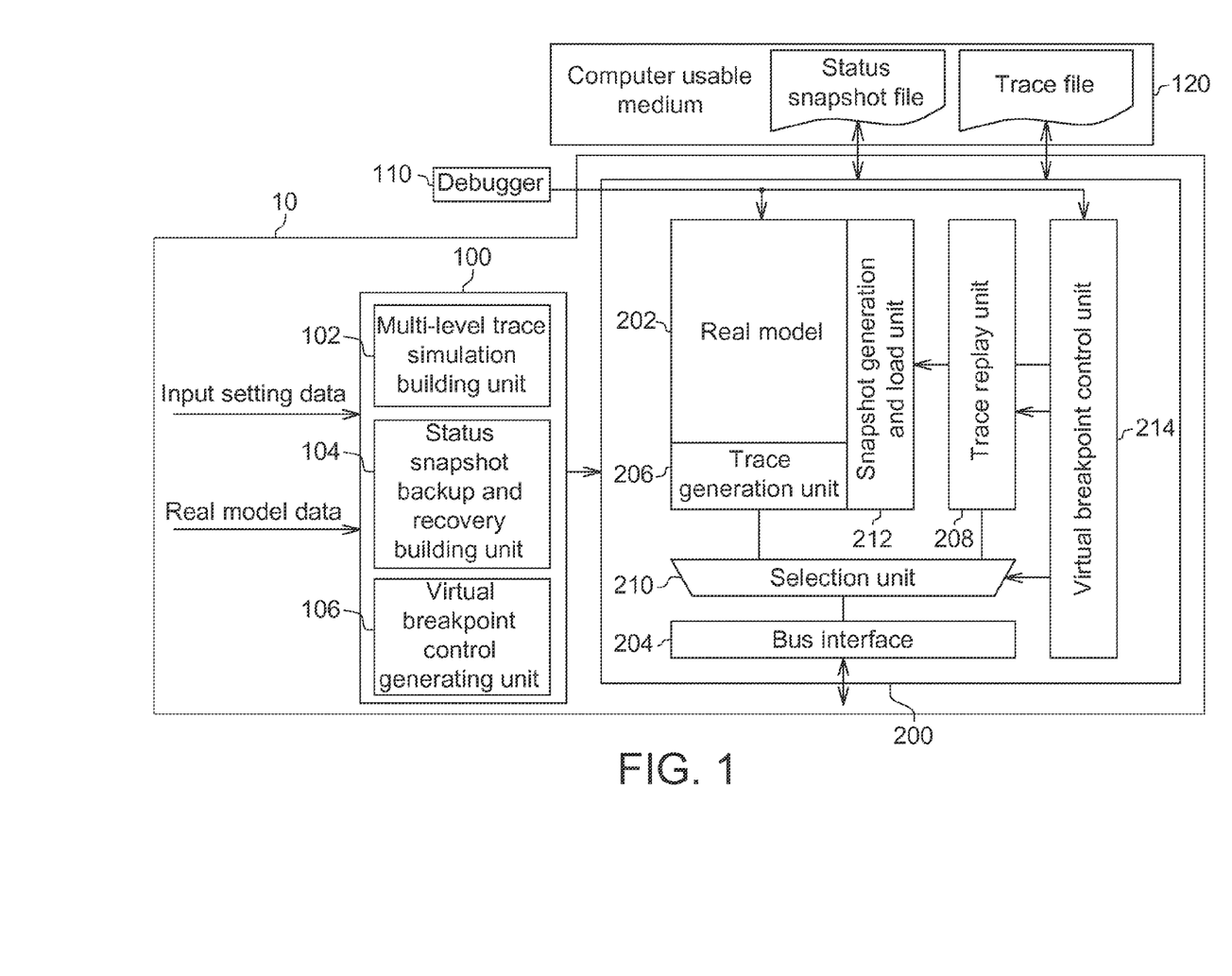
FIG. 1 is a schematic illustration showing a hybrid simulation system according to one embodiment.

FIG. 1 is a schematic illustration showing a hybrid simulation system 10 according to one embodiment. The hybrid simulation system of this embodiment may be implemented by, without limitation to, a personal computer (PC), a workstation or a mainframe. Referring to FIG. 1, the hybrid simulation system 10 includes a hybrid simulation model generator 100 and a hybrid simulation model 200. The hybrid simulation model generator 100 generates the hybrid simulation model 200 according to input setting data and real model data. The hybrid simulation model generator 100 includes a multi-level trace simulation building unit 102, a status snapshot backup and recovery building unit 104 and a virtual breakpoint control generating unit 106.

The multi-level trace simulation building unit 102 builds a trace generation unit 206 and a trace replay unit 208 of the hybrid simulation model 200 based on an input trace setting in the input setting data and a type of the bus interface in the real model data. The multi-level trace simulation building unit 102 decides a trace level of an associated trace file after reading the input trace setting, and defines a signal content and a time recorded in each trace level to build the trace file format, according to which the trace generation unit 206 builds the trace file or the trace replay unit 208 repeatedly plays the trace file.

The status snapshot backup and recovery building unit 104 builds a snapshot generation and load unit 212 of the hybrid simulation model 200 based on an input backup and recovery setting in the input setting data and the real model data. The status snapshot backup and recovery building unit 104 defines internal resources, such as registers, memories, various statuses, associated variables or the like, which have to be backed up at the switch point by a real model 202 of the hybrid simulation model 200 when a first simulation is executed, after reading the input backup and recovery setting. In addition, the status snapshot backup and recovery building unit 104 also defines an access method of the internal resources so that the corresponding status snapshot file can be generated at the switch point, and can be loaded in the subsequent simulation process to execute the real simulation.

The virtual breakpoint control generating unit 106 builds a selection unit 210 based on the type of the bus interface in the real model data, and builds a virtual breakpoint control unit 214 of the hybrid simulation model 200 based on a debugger 110. The virtual breakpoint control unit 214 built by the virtual breakpoint control generating unit 106 is electrically connected to the debugger 110 on the upper layer, and dynamically controls the switch process and the switch time of the multi-level trace switch according to the debugging requirement. According to the above-mentioned automatic operation, all of the multi-level trace simulation building unit 102, the status snapshot backup and recovery building unit 104 and the virtual breakpoint control generating unit 106 build the hybrid simulation model 200 in the hybrid simulation system 10.

The hybrid simulation model 200 includes a real model 202, a bus interface 204 and an acceleration model. The real model 202 can be built according to the real model data, which is substantially for simulating execution of a group of instructions on a hardware design. The bus interface 204 provides the real model 202 a function of accessing other slave models (not shown) in the hardware design. The acceleration model includes the trace generation unit 206, the trace replay unit 208, the selection unit 210, the snapshot generation and load unit 212 and the virtual breakpoint control unit 214. The acceleration model is mainly to be integrated with the real model 202 and provides the dynamic multi-level trace switching function so as to improve the long-time simulation process while maintaining the condition of the simulation precision level.

The trace generation unit 206 records the behavior of the real model 202 for accessing the other slave models in the hardware design as at least one trace file when the real model 202 is executing a first simulation (complete simulation), and stores the at least one trace file to a computer usable medium 120. In correspondence with the trace level decided by the multi-level trace simulation building unit 102, the at least one trace file includes multiple trace files corresponding to different levels, wherein the trace files corresponding to the levels correspond different simulation precision levels and simulation speeds. The contents of each trace file include the access time, the access control, the access address, the access data or the like.

Illustrations will be made with reference to the non-restrictive example, in which three trace files correspond to three trace levels. The trace file corresponding to the lower level of trace level 0 includes, for example, the complete access operations of the real model 202 to the external apparatus, and the corresponding times, read/write controls, addresses, data and the control information associated with the bus protocols corresponding to these operations are recorded in detail. The control information of the bus protocols has been omitted from the trace file corresponding to the higher level of trace level 1, for example. For example, the trace file corresponding to the highest level of trace level 2 only records the write operation of the real model 202 to the external apparatus. In addition, different levels of trace files may be generated between different cycles in the first simulation according to different requirements. The lowest level of trace file may also be synchronously generated in the full first simulation, and may be converted into other higher levels of trace files through the off-line processing, so that the extra loading of the overall system may be reduced.

The information recorded by the trace file with the lower trace level becomes more detailed, so that the simulation process may be reproduced more precisely in the subsequent repeated simulations, and the more complete information can be held for the analysis, but the simulation speed may become slower and the size of the trace file is also larger. On the contrary, the information recorded by the trace file with the higher trace level becomes less, so that the better simulation performance and the smaller size of the trace file are obtained in the subsequent repeated simulations, but the precision level is partially deteriorated. In the hybrid simulation system of this embodiment, the multi-level trace simulation may be utilized to provide the better simulation flexibility, so that the trace file with different trace levels are selected for the simulation according to the requirements, and the simulation speed can be effectively enhanced while maintaining the specific precision level. In contract, the conventional trace simulation only can simply repeatedly play the single trace file without the flexibility of use and cannot perform any analysis and exploration on the inside of the real model, thereby disabling the simulation of the system level from having the two advantages of the detailed architecture exploration and the simulation performance enhancement.

The trace replay unit 208 reads the corresponding trace file, stored in the computer usable medium 120, according to the requirements in many repeated simulations after the first simulation, and accordingly performs an access operation to play and generate the corresponding bus traffic. The selection unit 210 is, for example, a diplexer, which is substantially controlled by the virtual breakpoint control unit 214 and dynamically switches to the real model 202 to perform a real simulation or switches to the trace replay unit 208 to perform a trace simulation in many repeated simulations after the first simulation.

The snapshot generation and load unit 212 generates at least one status snapshot file corresponding to at least one specific time point when the real model 202 is executing the first simulation, stores the at least one status snapshot file to the computer usable medium 120, and loads the status snapshot file, corresponding to the specific time point, to the real model 202 in many repeated simulations when the selection unit 210 switches to the real model 202, so that the real model 202 can then execute the real simulation after the trace simulation. The virtual breakpoint control unit 214 interrupts the simulation process according to a virtual breakpoint, set by the debugger 110 in the trace file, to control the selection unit 210 to switch between the trace simulation and the real simulation in many repeated simulations.

Figure 2:
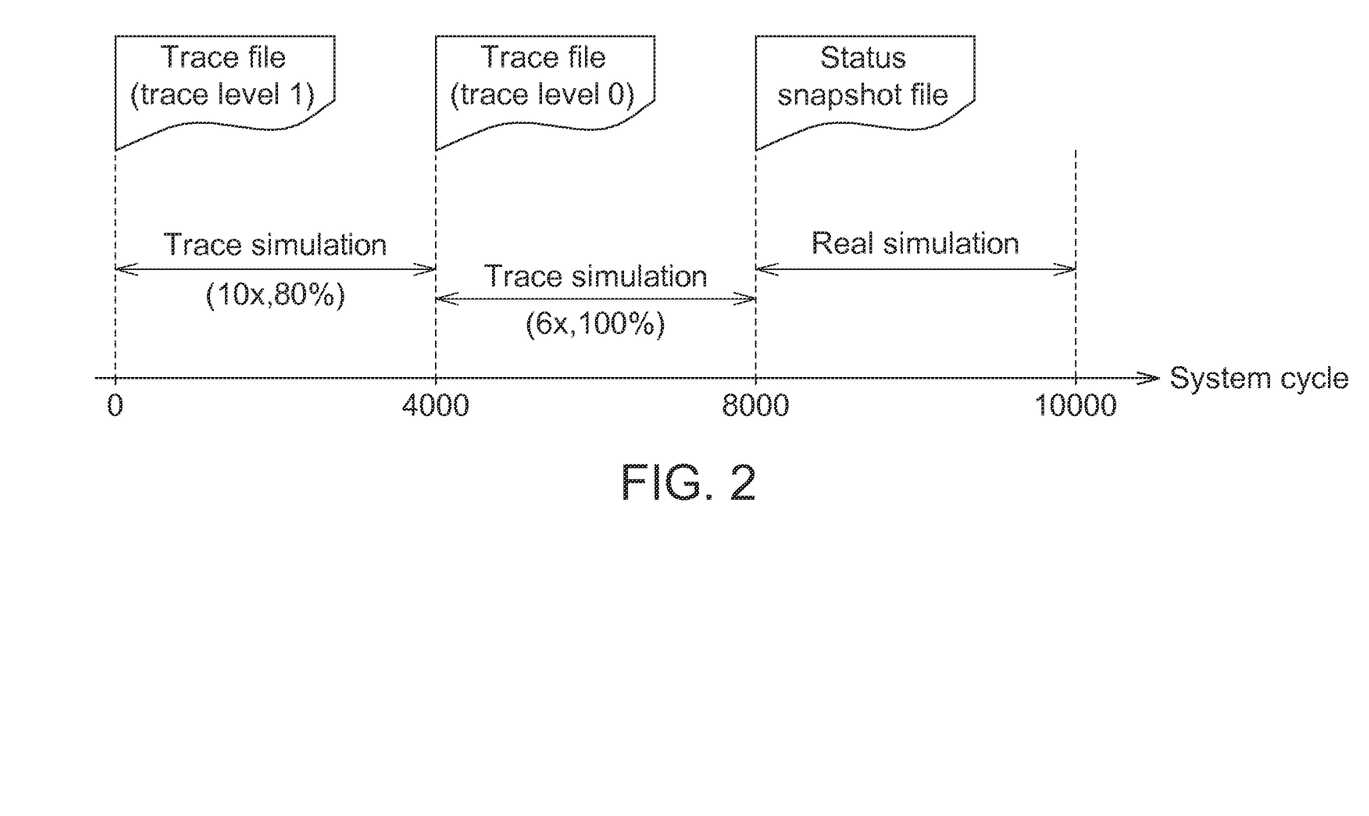
FIG. 2 is a schematic illustration showing an example of repeated simulations of architecture exploration of a hardware design according to one embodiment.

FIG. 2 is a schematic illustration showing an example of repeated simulations of architecture exploration of a hardware design according to one embodiment. In FIG. 2, the overall processes of the repeated simulations are divided into three time intervals, wherein the $0^{th}$ to $4,000^{th}$ cycles are assumed to be the non-important time sector and no analysis and exploration are made; the $4,000^{th}$ to $8,000^{th}$ cycles are assumed to simulate and explore the interconnection architecture inside the hardware design; and the $8,000^{th}$ to $10,000^{th}$ cycles are assumed to explore the internal parameters of the real model 202. In order to prevent the lengthy pre-simulation, the higher level of trace file (trace level 1) is loaded into the trace replay unit 208 in the period from the $0^{th}$ to $4,000^{th}$ cycles after the beginning of the simulation, and the real simulation is replaced with a trace simulation. Because the trace file (trace level 1) records the less information and the internal operation is omitted, the simulation in the period from the $0^{th}$ to $4,000^{th}$ cycles may be regarded as being executed at the highest speed.

Because the trace file (trace level 0) records more information than the trace file (trace level 1), the performance analysis is performed on the interconnection architecture inside the hardware design in detail and completely. Thus, the trace file (trace level 0) is loaded to the trace replay unit 208 to execute another stage of trace simulation in the period of the simulation process from the $4,000^{th}$ to $8,000^{th}$ cycles. Thereafter, the status snapshot file is loaded to the real model 202 for initialization in the period from the $8,000^{th}$ to $10,000^{th}$ cycles, so that the later stage of real simulation can be continued to analyze the performance influence caused by the internal parameter of the real model 202. The repeated analyses are performed many times through the above-mentioned process. Different levels of trace simulations are flexibly selected in the simulation process, so that the lengthy waiting time of the simulation process can be effectively shortened. Usually, the trace level corresponding to the trace file loaded at the time closer to the trace simulation of the real simulation is lower. However, the disclosure is not particularly restricted thereto.

In addition, the virtual breakpoint control unit 214 can control the setting positions of multiple switch points to control the trace replay unit 208 to execute different levels of trace simulations at the switch points and thus to reach a target simulation speed or a target simulation precision level. That is, the virtual breakpoint control unit 214 calculates the execution times of different levels of trace simulations according to the target simulation speed or the target simulation precision level and the simulation precision level or the simulation speed corresponding to the trace files of the levels, and sets the switch points according to the calculated execution times.

Illustrations will be made with reference to the example of FIG. 2, in which the trace file (trace level 1) corresponds to 10 multiples of acceleration and 80% of precision level and the trace file (trace level 0) corresponds to 6 multiples of acceleration and 100% of precision level. If the target simulation speed is equal to 9 multiples of acceleration, the virtual breakpoint control unit 214 sets the position of the switch point at the $6,000^{th}$ cycle, so that the ratio of the time length of the first stage of trace simulation to the time length of the second stage of trace simulation is equal to 3:1, and the target simulation speed of 9 multiples of acceleration can be achieved because $10\times0.75+6\times0.25=9$. In addition, if the target simulation precision level is 85%, the virtual breakpoint control unit 214 sets the position of the switch point at the $6,000^{th}$ cycle so that the ratio of the time length of the first stage of trace simulation to the time length of the second stage of trace simulation is equal to 3:1, and the target simulation precision level of 85% can be achieved because $80\times0.75+100\times0.25=85$.

The virtual breakpoint control unit 214 can further set the virtual breakpoint, such as the $8,000^{th}$ cycle of FIG. 2, so as to switch from the trace simulation to the real simulation, so that the internal parameters of the real model 202 can be gradually viewed in detail. The developer can set a breakpoint in the specific instruction in a manner similar to the typical debugging operation, wherein the breakpoint is converted into the corresponding address through a tool chain, and transmitted to the virtual breakpoint control unit 214 through the debugger 110. The virtual breakpoint control unit 214 sets the switch point according to the target simulation speed or the target simulation precision level, and sets a virtual breakpoint to the trace file according to the converted address. Consequently, after the hybrid simulation model 200 starts to execute the simulation, the virtual breakpoint control unit 214 controls the trace replay unit 208 to switch to different levels of trace simulations according to the switch point in the trace file, and controls the selection unit 210 to switch to the real model 202 to perform the real simulation when the virtual breakpoint in the trace file is triggered. Thus, the developer can execute the debugging operation in one single step. Compared with the conventional debugging method, in which the converted address has to be compared with the memory address in the real simulation precisely, the debugging operation can be performed, after the virtual breakpoint in the trace file is triggered, without the column address comparison, so that the system performance can be enhanced.

Figure 3:
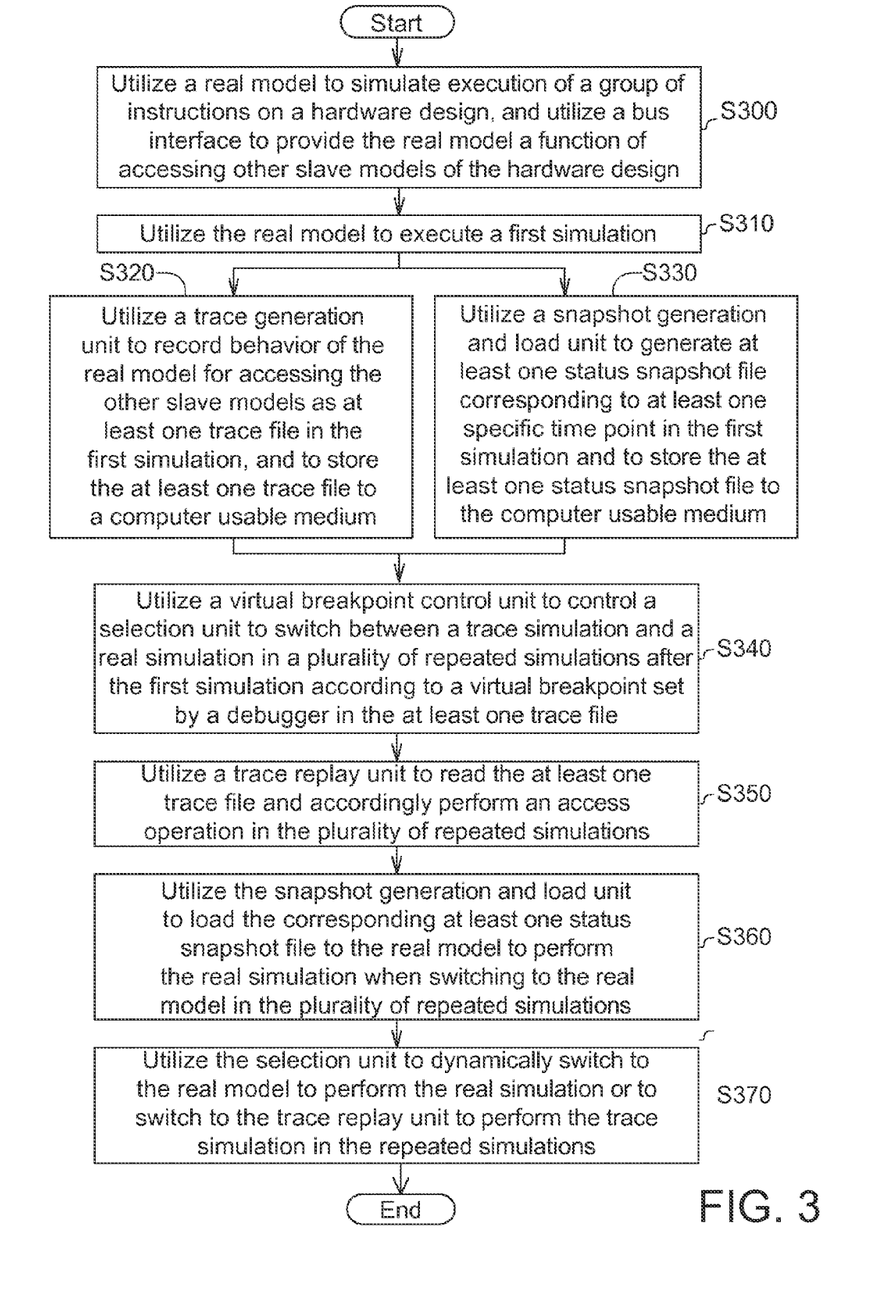
FIG. 3 is a flow chart showing a hybrid simulation method according to one embodiment.

FIG. 3 is a flow chart showing a hybrid simulation method according to one embodiment. In step S300, a real model is utilized to simulate execution of a group of instructions on a hardware design, and a bus interface is utilized to provide the real model a function of accessing other slave models of the hardware design. In step S310, a real model is utilized to execute a first simulation. In step S320, a trace generation unit is utilized to record the behavior of the real model for accessing the other slave models as at least one trace file in the first simulation, and to store the at least one trace file to a computer usable medium. In step S330, a snapshot generation and load unit is utilized to generate at least one status snapshot file corresponding to the at least one specific time point in the first simulation, and to store the at least one status snapshot file to the computer usable medium.

In step S340, a virtual breakpoint control unit is utilized to control a selection unit to switch between a trace simulation and a real simulation in multiple repeated simulations after the first simulation according to a virtual breakpoint, set by a debugger in the at least one trace file. In step S350, a trace replay unit is utilized to read the at least one trace file and accordingly perform an access operation in the multiple repeated simulations. In step S360, a snapshot generation and load unit is utilized to load the corresponding at least one status snapshot file to the real model to perform the real simulation when switching to the real model in the multiple repeated simulations. In step S370, a selection unit is utilized to dynamically switch to the real model to perform the real simulation or switch to the trace replay unit to perform the trace simulation in the multiple repeated simulations.

The operation principles of the hybrid simulation method have been described in the hybrid simulation system 10 and the descriptions associated therewith, so detailed descriptions thereof will be omitted.

Figure 4:
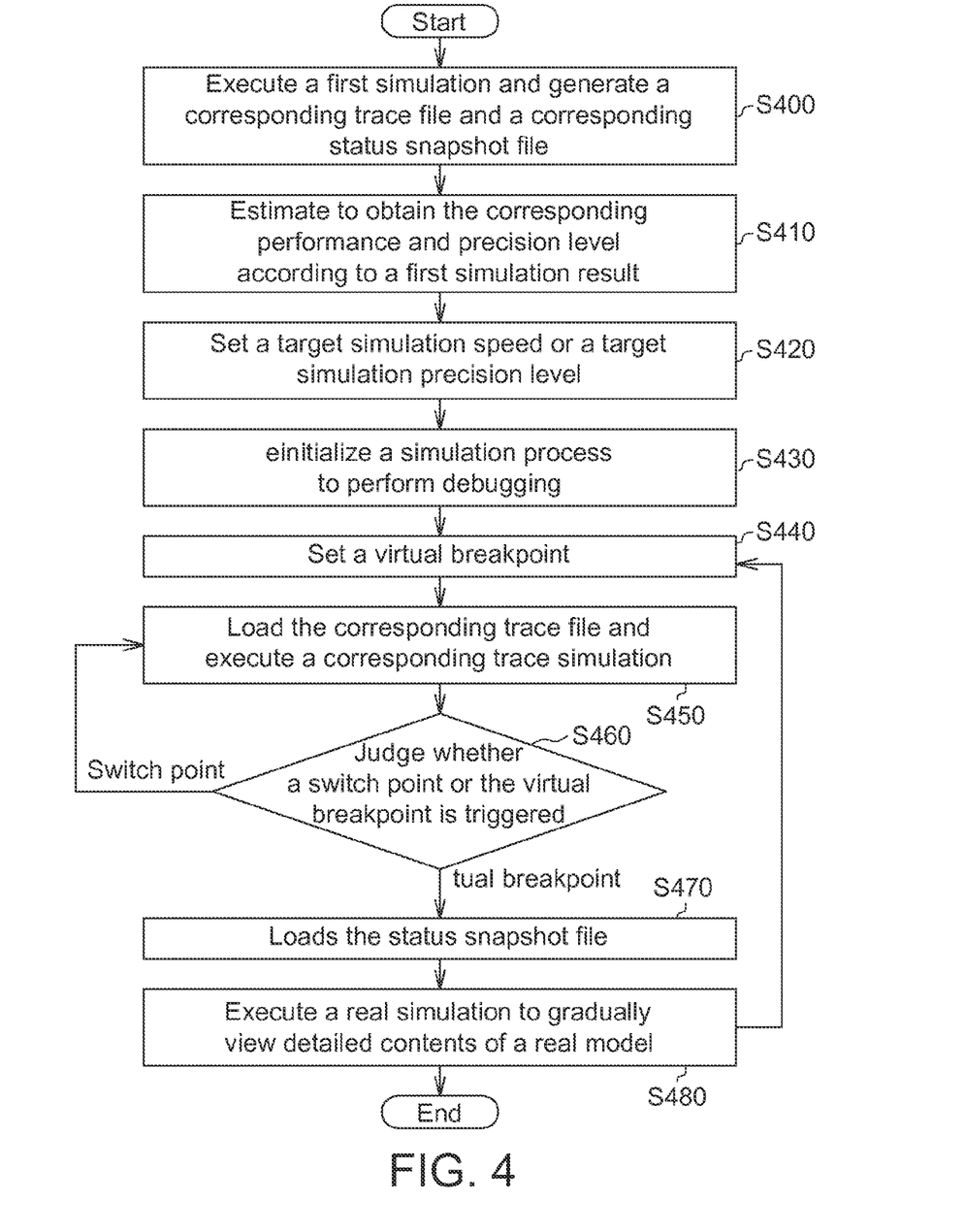
FIG. 4 is a partially detailed flow chart showing a hybrid simulation method according to one embodiment.

FIG. 4 is a partially detailed flow chart showing a hybrid simulation method according to one embodiment. FIG. 4 is substantially, but without limitation to, a partially detailed flow chart of an example of the hybrid simulation method of FIG. 3. In step S400, the first simulation is executed and the corresponding trace file and status snapshot file are generated. In step S410, the corresponding performance and precision level are obtained by estimating the result of the first simulation. In step S420, a target simulation speed or a target simulation precision level is set. In step S430, the simulation process is reinitialized to perform debugging. In step S440, a virtual breakpoint is set. In step S450, the corresponding trace file is loaded, and the corresponding trace simulation is executed. In step S460, it is judged whether the switch point or virtual breakpoint is triggered. If the switch point is triggered, the process goes back to the step S450. If the virtual breakpoint is triggered, the process enters step S470 to load the status snapshot file. In step S480, the real simulation is executed to gradually view the detailed contents of the real model. After the step S480, the overall simulation process ends. In addition, if another detection has to be made, the process may also return to the step S440 after the step S480 to reset the new virtual breakpoint.

In the hybrid simulation system and method disclosed in the embodiment of this disclosure, a hybrid simulation model may be automatically generated through the simple setting input, and it is possible to dynamically switch between the real simulation and the trace simulation in the simulation process according to different levels of trace files and the assistance of the status snapshot file. The trace simulation is performed on the sector with the high repeatability and the non-important performance analysis in the simulation process, while the real simulation is performed on the important key sector by the immediately dynamic switching. Thus, the lengthy simulation process can be improved while maintaining the simulation precision level, and different multiples of acceleration effects can be achieved by switching to different precision levels of trace simulations through the multi-level trace file.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hybrid simulation system, comprising:
a processor;
a hybrid simulation model, which comprises:
a real model for simulating execution of a group of instructions on a hardware design;
a bus interface for providing the real model a function of accessing other slave models of the hardware design; and
an acceleration model, which comprises:
a trace generation unit for recording behavior of the real model for accessing the other slave models as at least one trace file and storing the at least one trace file to a computer usable medium when the real model is executing a first simulation;
a trace replay unit for reading the at least one trace file and accordingly performing an access operation in a plurality of repeated simulations after the first simulation;
a selection unit for dynamically switching to the real model to perform a real simulation or switching to the trace replay unit to perform a trace simulation in the plurality of repeated simulations;
a snapshot generation and load unit for generating at least one status snapshot file corresponding to at least one specific time point and storing the at least one status snapshot file to the computer usable medium when the real model is executing the first simulation, and loading the corresponding at least one status snapshot file to the real model when switching to the real model in the plurality of repeated simulations; and
a virtual breakpoint control unit for controlling the selection unit to switch between the trace simulation and the real simulation in the plurality of repeated simulations according to a virtual breakpoint set by a debugger in the at least one trace file.

2. The hybrid simulation system according to claim 1, further comprising a multi-level trace simulation building unit for building the trace generation unit and the trace replay unit based on an input trace setting and a type of the bus interface.

3. The hybrid simulation system according to claim 1, further comprising a status snapshot backup and recovery unit for building the snapshot generation and load unit based on an input backup and recovery setting and the real model.

4. The hybrid simulation system according to claim 1, further comprising a virtual breakpoint control generating unit for building the selection unit based on a type of the bus interface, and building the virtual breakpoint control unit based on the debugger.

5. The hybrid simulation system according to claim 1, wherein in the plurality of repeated simulations, the virtual breakpoint control unit controls the selection unit to switch to the trace replay unit to perform the trace simulation before the virtual breakpoint, and controls the selection unit to switch to the real model to perform the real simulation at the virtual breakpoint.

6. The hybrid simulation system according to claim 1, wherein the at least one trace file comprises a plurality of trace files corresponding to a plurality of levels, and the trace files of the levels correspond to different simulation precision levels and simulation speeds.

7. The hybrid simulation system according to claim 6, wherein the virtual breakpoint control unit can further set a plurality of switch points to control the trace replay unit to execute different levels of trace simulations to reach a target simulation speed or a target simulation precision level at each of the switch points before the virtual breakpoint.

8. The hybrid simulation system according to claim 7, wherein the virtual breakpoint control unit calculates execution times of the different levels of trace simulations according to the target simulation speed or the target simulation precision level and the simulation precision level or the simulation speed corresponding to the trace file corresponding to each of the levels, and sets the switch points according to the execution times.

9. A hybrid simulation method, comprising:
utilizing a real model to simulate execution of a group of instructions on a hardware design, and utilizing a bus interface to provide the real model a function of accessing other slave models of the hardware design;
utilizing the real model to execute a first simulation;
utilizing a trace generation unit to record behavior of the real model for accessing the other slave models as at least one trace file in the first simulation, and to store the at least one trace file to a computer usable medium;
utilizing a snapshot generation and load unit to generate at least one status snapshot file corresponding to at least one specific time point in the first simulation and to store the at least one status snapshot file to the computer usable medium;
utilizing a virtual breakpoint control unit to control a selection unit to switch between a trace simulation and a real simulation in a plurality of repeated simulations after the first simulation according to a virtual breakpoint set by a debugger in the at least one trace file;
utilizing a trace replay unit to read the at least one trace file and accordingly perform an access operation in the plurality of repeated simulations after the first simulation;
utilizing the snapshot generation and load unit to load the corresponding at least one status snapshot file to the real model to perform the real simulation when switching to the real model in the plurality of repeated simulations; and
utilizing the selection unit to dynamically switch to the real model to perform the real simulation or to switch to the trace replay unit to perform the trace simulation in the plurality of repeated simulations.

10. The method according to claim 9, further comprising:
utilizing a multi-level trace simulation building unit to build the trace generation unit and the trace replay unit based on an input trace setting and a type of the bus interface.

11. The method according to claim 9, further comprising:
utilizing a status snapshot backup and recovery unit to build the snapshot generation and load unit based on an input backup and recovery setting and the real model.

12. The method according to claim 9, further comprising:
utilizing a virtual breakpoint control generating unit to build the selection unit based on a type of the bus interface, and to build the virtual breakpoint control unit based on the debugger.

13. The method according to claim 9, further comprising:
utilizing the virtual breakpoint control unit to control the selection unit to switch to the trace replay unit to perform the trace simulation before the virtual breakpoint, and to control the selection unit to switch to the real model to perform the real simulation at the virtual breakpoint in the plurality of repeated simulations.

14. The method according to claim 9, wherein the at least one trace file comprises a plurality of trace files corresponding to a plurality of levels, and the trace files corresponding to the levels correspond to different simulation precision levels and simulation speeds.

15. The method according to claim 14, further comprising:
utilizing the virtual breakpoint control unit to set a plurality of switch points to control the trace replay unit to execute different levels of trace simulations to reach a target simulation speed or a target simulation precision level at each of the switch points before the virtual breakpoint.

16. The method according to claim 15, further comprising:
utilizing the virtual breakpoint control unit to calculate execution times of the different levels of trace simulations according to the target simulation speed or the target simulation precision level and the simulation precision level or the simulation speed corresponding to the trace file corresponding to each of the levels, and to set the switch points according to the execution times.

* * * * *